United States Patent
Johns et al.

(10) Patent No.: US 8,069,212 B2
(45) Date of Patent: Nov. 29, 2011

(54) SYSTEM AND METHOD FOR NOTIFICATION OF DIGITAL IMAGES TO BE SHARED VIA A SERVICE PROVIDER

(75) Inventors: Mark Johns, San Francisco, CA (US); Kamran Mohsenin, Albany, CA (US)

(73) Assignee: Eastman Kodak Company, Rochester, NY (US)

( * ) Notice: Subject to any disclaimer, the term of this patent is extended or adjusted under 35 U.S.C. 154(b) by 60 days.

(21) Appl. No.: 12/564,159

(22) Filed: Sep. 22, 2009

(65) Prior Publication Data
US 2010/0017491 A1 Jan. 21, 2010

Related U.S. Application Data

(62) Division of application No. 10/683,100, filed on Oct. 10, 2003, now Pat. No. 7,734,700.

(51) Int. Cl.
G06F 15/16 (2006.01)
H04M 11/00 (2006.01)

(52) U.S. Cl. ........................ 709/206; 379/93.01
(58) Field of Classification Search .............. 709/206; 370/93.01
See application file for complete search history.

(56) References Cited

U.S. PATENT DOCUMENTS

| | | | |
|---|---|---|---|
| 5,760,917 A | 6/1998 | Sheridan | |
| 6,018,774 A | 1/2000 | Mayle et al. | |
| 6,035,323 A | 3/2000 | Narayen et al. | |
| 6,442,573 B1 | 8/2002 | Schiller et al. | |
| 6,535,228 B1 | 3/2003 | Bandaru et al. | |
| 6,798,533 B2 | 9/2004 | Tipimeni | |
| 7,149,959 B1 | 12/2006 | Jones et al. | |
| 7,272,662 B2 * | 9/2007 | Chesnais et al. | 709/246 |
| 2002/0102012 A1 | 8/2002 | Keller et al. | |
| 2002/0107925 A1 * | 8/2002 | Goldschneider et al. | 709/206 |
| 2002/0138581 A1 * | 9/2002 | MacIntosh et al. | 709/206 |
| 2002/0156923 A1 | 10/2002 | Tanimoto | |
| 2002/0188638 A1 | 12/2002 | Hamscher | |
| 2003/0097410 A1 | 5/2003 | Atkins et al. | |
| 2003/0154178 A1 | 8/2003 | McIntyre et al. | |
| 2003/0181199 A1 | 9/2003 | Yamaguchi et al. | |
| 2003/0200268 A1 * | 10/2003 | Morris | 709/206 |
| 2004/0101156 A1 | 5/2004 | Kacker | |
| 2004/0172451 A1 | 9/2004 | Biggs et al. | |
| 2005/0075895 A1 | 4/2005 | Mohsenin et al. | |

FOREIGN PATENT DOCUMENTS
WO  WO 02/09435  1/2002

OTHER PUBLICATIONS

"Yahoo Photos Help", Apr. 13, 2001, XP002247402 URL:http://web.archive.org/web/20010413/http://help.yahoo.com/help/us/photos.

* cited by examiner

*Primary Examiner* — Philip Chea
(74) *Attorney, Agent, or Firm* — Frank Pincelli; Eugene I. Shkurko

(57) ABSTRACT

A method and system for organizing and sharing digital images over a communication network wherein an image server at a service provider stores digital images for a customer which may have more two more electronic addresses which may receive e-mail. The server automatically forwarding all electronic mail having an address from one of the registered two or more electronic addresses to the primary electronic address that is received over a communication network. The e-mail includes a link to the share images and/or images folder.

9 Claims, 3 Drawing Sheets

SYSTEM AND METHOD FOR NOTIFICATION OF DIGITAL IMAGES TO BE SHARED VIA A SERVICE PROVIDER

CROSS REFERENCE TO RELATED APPLICATIONS

This is a Divisional of application Ser. No. 10/683,100 filed Oct. 10, 2003 now U.S. Pat. No. 7,734,700, now allowed.

FIELD OF THE INVENTION

The present invention relates to sharing digital images and notification of updated shared image folders stored at an image provider.

BACKGROUND OF THE INVENTION

There are currently many websites that allow users to create online collections of photos (usually called "albums"), and then share these albums with one or many recipients. When a user wants to share a set of photos, they need to perform the following set of tasks: 1. upload the image(s) into a particular album; 2. go to a web browser and go to the photo sharing website; 3. select the album that contains the new photos; 4. select/enter the e-mail addresses for the desired recipients; and 5. send the message. While this is a straightforward process, it actually requires a lot of work on the part of the user. In particular, the upload process normally takes a long time, so that the user must endure a long wait before they can proceed to steps 2-5. Also, step 4 can be cumbersome, particularly for users who like to share their photos with large groups. Also, every time that the user wants to share new photos, they must go through the entire process again.

The current state of the art is also problematic for recipients. Since each photo-share is sent as a separate message, a recipient can quickly become overwhelmed with multiple share e-mails, and will not be able to keep track of which photos came in which message. In addition, many people have multiple e-mail addresses, so that they must check several accounts in order to manage all of their incoming photo shares.

ADVANTAGES

A system and a method made in accordance with the present invention was developed to simplify the image sharing process as described above. It should be noted that this system and method can easily be applied to any types of digital media (including video, audio, text, etc.) there is nothing about it that is specific to images. Users are provided the ability to create a higher-level organization (called a "folder"). A folder will be able to hold one or many albums, and serves as a convenient way for users to organize their albums. This invention allows the owner of a folder to associate a "notification list" with the folder (a set of e-mail addresses and/or phone #s). When the user chooses to upload photos, they will have the option to upload them to an album that is in the folder. Once this is done, the server will automatically queue a notification for everyone on the notification list for the folder. For example, the steps of this process includes: user creates a new folder; user selects/enters the notification list for the folder; user uploads a set of images into an album in the folder (this can be a new album or an existing album); and once the upload completes, a notification message is automatically queued for each of the recipients; at some point (as described later), the notification message is sent.

For the user, there are two primary advantages to this approach. First, the user does not have to wait until the upload is complete to finish the sharing task. All of the work required from the user can be done before the upload is initiated. Since the upload is usually the most time-consuming step of the process, this is a major advantage. Second, when the user wants to send more photos to the same recipients, they only have to upload more photos to the shared folder. The notification message is sent automatically by the image services provider.

In addition, each recipient may manage their own "notification preferences". In particular, the recipient can choose how often they would like to receive notifications (for example: never, every time new content is added to a folder, once a day, once a week, etc.). In this way, the recipient can ensure that they will not be overwhelmed by too many incoming e-mails. If the recipient chooses a periodic notification scheme (such as "once a week"), then all of their notifications are consolidated in a single e-mail once a week. So, if person A is subscribed to folder X, folder Y and folder Z, then A will receive one e-mail per week which will inform them of any new content available in any of the three folders.

Also, the recipient will be able to enter multiple e-mail addresses, and can select one of them as the "primary address" (of course, phone numbers or other addressable identifiers can be used instead of e-mail addresses). In this case, all of the shares sent to any of the addresses, are consolidated into a single message sent to the primary address. In addition, when the recipient goes to the website to see the new photos, they will easily be able to navigate to other albums in the same folder. In the current state of the art, each album share is seen as an isolated message, and recipients are not able to easily group related shares.

SUMMARY OF THE INVENTION

In accordance with one aspect of the present invention there is provided a method for organizing and sharing digital images over a communication network to a single user having more than one electronic address, comprising the steps of:

providing an image server by a service provider for storing digital images for a first user, the first user registering two or more electronic addresses which may receive e-mail;

the server recording one of the two or more electronic addresses as the primary electronic address in accordance with the first users instructions; and the server automatically forwarding all electronic mail having an address from one of the registered two or more electronic addresses to the primary electronic address that is received over a communication network, the e-mail includes a link to shared images and/or image folders.

In accordance with another aspect of the present invention there is provided a system for organizing and managing digital images over a communication network to a single user having more than one electronic address, comprising:

an image service provider having an image server for storing digital images for a first user, the user registering two or more electronic addresses which may receive e-mail over a communication network, the user designating one of the two or more electronic addresses as the primary electronic address, the server automatically forwarding all electronic messages addressed to either of the two or more registered electronic addresses to the primary electronic address for use by the first user, the e-mail includes a link to digital images and/or image folders stored on the server.

In accordance with yet another aspect of the present invention there is provided a method for automatically sharing digital images over a communication network, comprising the steps of:

a service provider providing a owner account for storing digital images on a server on behalf of the owner and for accessing over a communication network;

the server receiving digital images over the communication network from more than one source for placement in the owner account; and the server sending a single electronic notification over the communication network to the owner that new digital images have been placed in the folder.

In accordance with still another aspect of the present invention there is provided a system for automatically sharing digital images over a communication network, comprising the steps of:

a server of a service provider for storing digital images in a customer account on behalf of the customer and for allowing accessing to the digital images over a communication network;

the server receiving digital images over the communication network from more than one source for placement in the owner account; and the server sending a single electronic notification over the communication network to the customer that digital images have been placed in the folder.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
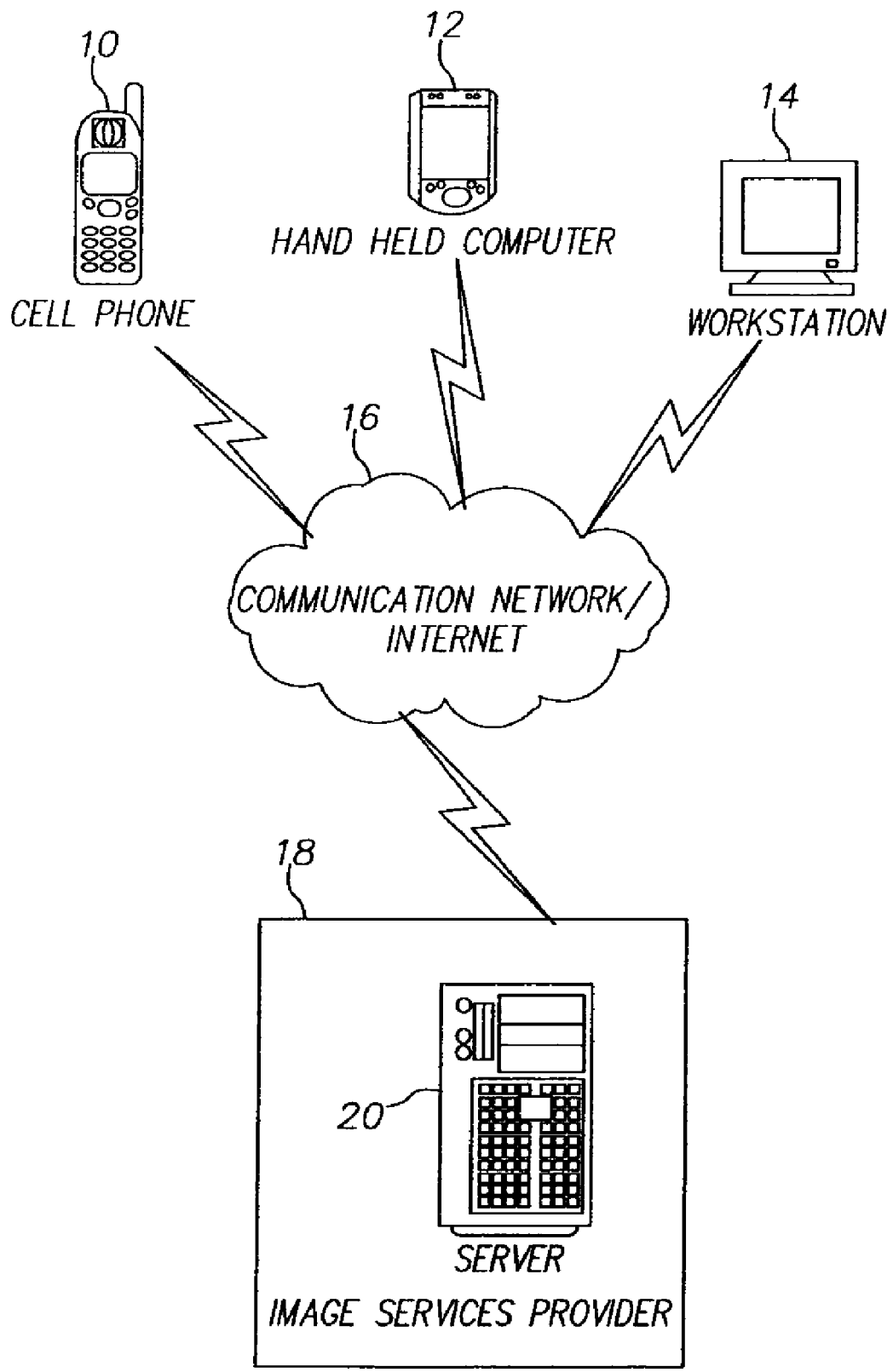
FIG. 1 is a schematic diagram of a system for operating in accordance with the present invention.

Referring to FIG. 1 there is illustrated a system in accordance with the present invention. The system includes access devices 10, 12 and 14 which are capable of communication of data to an on-line image services provider 18. In the particular embodiment illustrated, the access device 10 is a wireless phone digital camera (often referred to as a phone cam); access device 12 is PDA (personal digital assistant) and access device 14 is a personal computer/workstation (PC). Service provider 18 is an on-line service provider such as Ofoto that provides goods and services with respect to images stored at their site for a plurality of customers. The image service provider 18 typically has a data base of customers each having their customer account and associated ID all stored on a server 20. An example of the various services and products that may be offered by the service provider 18 is the storage of digital images, the ability to share images with others over the Communication Network/Internet 16, the providing of prints of their stored images, and providing other products having images thereon. The image provider 18 may of course provide any other desired service or goods desired.

A fundamental unit in an image services provider's data model is the photo. With this scheme, the data model around photos is quite simple—each photo can belong to one or many albums, and each album belongs to exactly one person. This invention uses a new level of organization (above albums). These higher-level objects are referred to as 'folders', but many other words would also be appropriate—'rooms', 'galleries', 'groups', 'shoeboxes', etc. Just as each photo can be placed into one or many albums, each album can be placed into one or many folders.

In some current image provider environments which use albums, permissions for access are fairly straightforward: the creator of an album has read/write access to that album, and can share it with others who have read-only access. Anyone who has read-only access can leave comments, but these can be removed by the album's creator. This invention call for permissions to work somewhat differently for folders—the main idea is that the creator of a folder can invite other people to 'subscribe' to the folder. There are several ways in which subscriptions can be configured, which are discussed in the following sections.

With respect to viewing permissions, there are at least three possible types of folders. For the group type of folder, the owner of the folder decides to invite 1 or many individuals to subscribe to the folder. Assuming that these people accept the subscription, they will be able to see the folder itself, along with all of its constituent albums. Subscribers will automatically be notified when there are changes to a folder, and they will have a persistent link to the folder from their account. The owner of a folder always has the right to rescind the permissions for any individual subscriber. For the private type of folder, the owner of the folder is the only person who can see the folder. The owner has the option of sharing individual albums within the folder. However, none of the recipients will be aware that the albums are part of a higher-level folder. Note that a private folder is really just a special case of a group folder (where the number of subscribers is 0). Some users might find it to be a very useful tool for organizing their albums, but would not want to have subscribers. For the public type of folder, the owner of the album has decided that anyone can view the folder. In order for this to be useful, there needs to be mechanisms by which people can find a public folder. There are multiple ways in which this can be accomplished. One approach is to allow the owner to add a shortcut name to a folder. So, if Bob creates a folder for albums of his prize-winning stamp collection, he might call it "BobsStamps". There are least two ways to access a folder using its shortcut name. First, there is a search function somewhere on the image services provider's site that allows one to type in a shortcut name to check for matches. A second way is for a user to navigate directly to a URL (Uniform Resource Locator) of the form www.ImageServiceProvider.com/folders/Bob7311/BobsStamps/.

It may be beneficial to create other mechanisms for finding folders. One possibility would be a search by location (ZIP code, street address, GPS, etc., that would allow one to find active folders for their current location. Another possibility would be to allow the creator of a folder to associate "keywords" with the folder. This could be used to organize folders into some sort of global directory, or to facilitate searching. This could allow image service provider moderated public albums. Another possibility is that the user may search the image database using the author's name (real-life name or screen name). When an individual navigates to a public folder, they have the option of anonymously viewing it, or subscribing to it. A public folder can also be a group folder where the owner has created a public folder, and has also explicitly invited certain individuals to become subscribers.

Anyone who has access to an album has the ability to add comments on the photos in that album. The owner of the album has the ability to delete those comments. Also, multiple users may add albums containing one or more images to a single folder. In one embodiment, three types of write permissions may be allowed. The read-only case never allows a subscriber to add an album to the folder. The only content that they are able to add is a comment on a per-photo basis. The read-write case allows the subscriber to add comments to individual photos, and also add their own albums to the folder. The moderated case allows the subscriber to add albums to the folder. However, these albums are not immediately visible to other subscribers. Instead, the creator of the folder must first look at the album and approve it, before the notifications go out and it is visible.

The data model should support the possibility that some subscribers to a folder have one type of permission, while others have a different type of permission. We should support the possibility that the owner of a folder can change these settings at any time. Also, the owner of a folder should be allowed to remove subscribers at any time.

When the owner of a folder adds someone to the subscription list for that folder, the potential subscriber will receive an e-mail inviting them to come view the folder. At this time, they have the option to unsubscribe from the folder, and to set their subscription preferences for that folder (which can always be changed later). The subscriber can choose not to set their subscription preferences, in which case they will receive the default values for that folder. For example, one of the preferences is the notification frequency, which may be set to no-notifications, real-time, or buffered. No-notifications would result in the subscriber not receiving any e-mail notifications when new content has been added to the folder. The subscriber would still have access to the folder when they sign into their account. Real-time would cause all notifications to be performed as soon as the corresponding action takes place. So, as soon as a new album is added to a folder, the subscriber is notified. If a new photo is added to that album, a new notification will go out. Buffered would delay the notification a predetermined amount of time after new content is added (perhaps 1 hour). The timer is reset the album is updated, so that the notification will not be sent until the album remains unchanged for 1 hour. The subscriber in one embodiment could configure their timeout preferences—so one user might want to wait for 24 hours, while another might want to wait 5 minutes. Of course, other notification rules could easily be implemented—the above are only illustrative of the space of possible notification rules.

Figure 2:
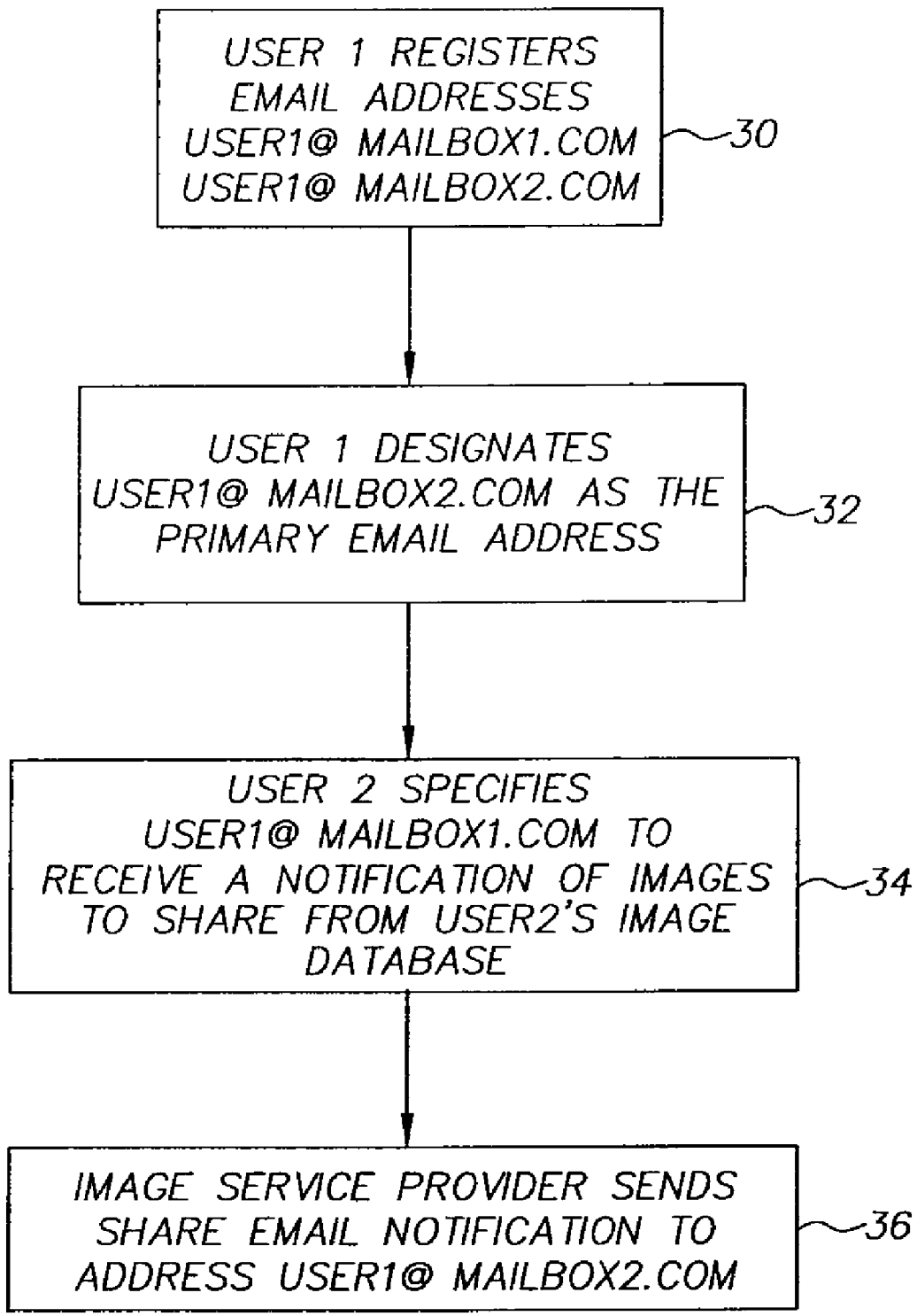
FIG. 2 is a flow diagram illustrating a image share notification to the primary e-mail address.
Figure 3:
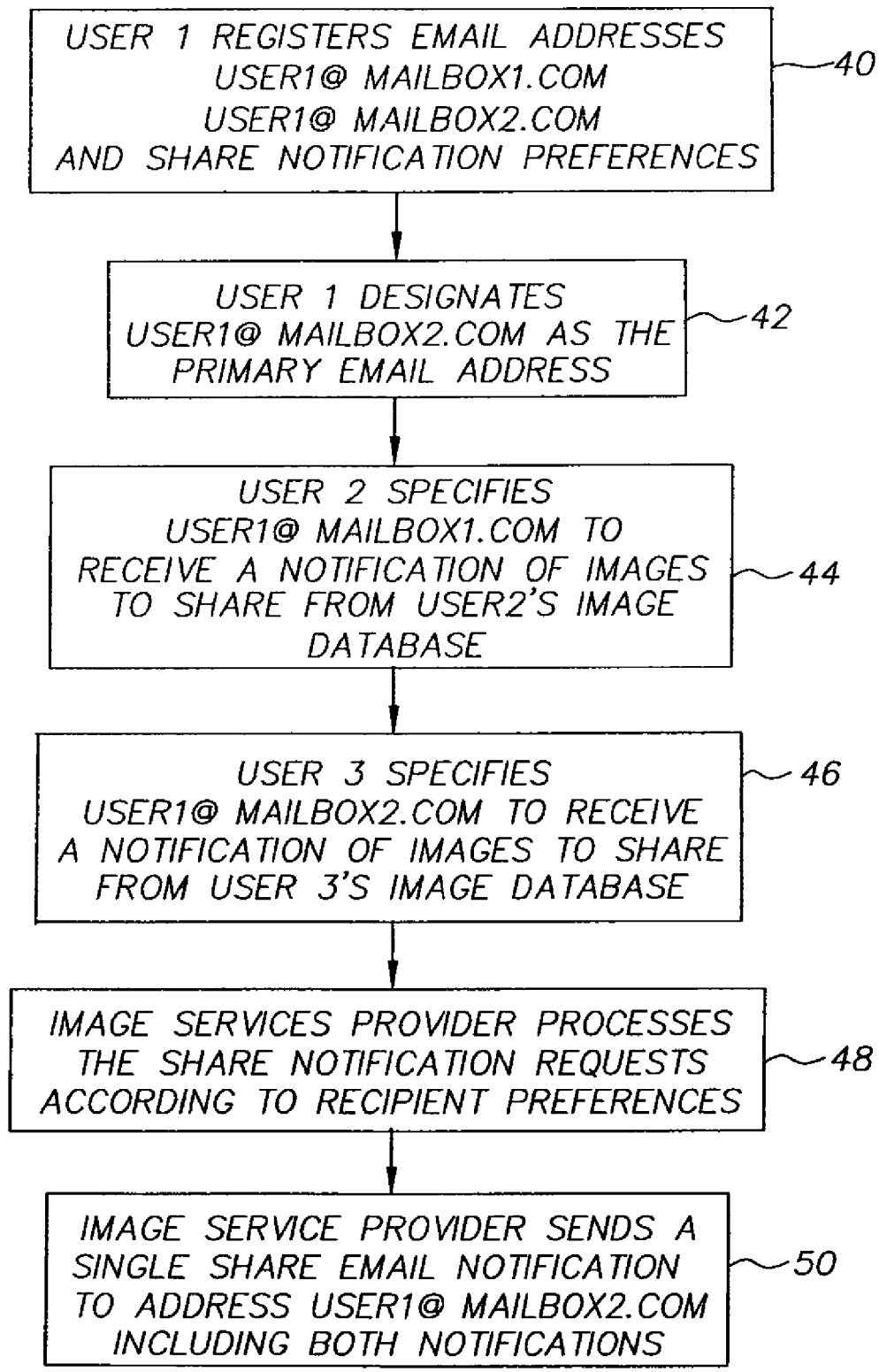
FIG. 3 is a flow diagram illustrating an image share notification that aggregates notifications.

A subscriber may also have the ability to specify their contact information. This can include an e-mail address (possibly other than the one that the owner originally entered), a mobile phone #, or other device-specific identifiers. Thus, one user might choose to receive all of their notifications through e-mail, another might choose to receive notifications through MMS/SMS, while a third might choose both. Also, a user may have the ability to consolidate notifications across all of their folders. FIG. 2 illustrates an example flow of an image share notification to the primary e-mail address that a user chooses to receive their share notifications. A first user initially registers multiple electronic addresses associated with the user account 30. Then, the first user designates one of the electronic addresses as the primary electronic address 32. A second user shares images with the first user by specifying an electronic address different from the primary electronic address specified by the first user 34. Finally, the image service provider server sends the share notification to the first user using the first user's primary electronic address 36. FIG. 3 illustrates an image share notification that consolidates share notifications across multiple folders. In FIG. 3 a first user initially registers the electronic addresses and sets the share notification preferences 40. Then, the first user designates one of the electronic addresses as the primary electronic address 42. A second user shares images with the first user by specifying an electronic address of the first user 44. A third user shares images with the first user by specifying an electronic address of the first user 46. The image service provider checks the notification preferences of the first user and combines the sharing notifications of the second and third user in one electronic message 48. Finally, the image service provider server sends the consolidated share notification to the first user using the first user's primary electronic address 50.

A subscriber may be able to specify whether or not they can be contacted directly by other subscribers to that folder. This does not necessarily mean that their contact information is visible to other subscribers, but instead that another subscriber can send them a private message through their preferred contact mechanism. In order to enable this, each subscriber to a group may specify a "screen name". This is the only identifier that will always be visible to other users—other information can be revealed or concealed on an individual basis.

In the current image services provider's workflow, a user must specify an album whenever they upload a photo. One of the options is to create a new album, in which case the user selects a name for the new album. Folders may be used as a mechanism to enable auto-albuming. If a user decides to upload directly to a folder, rather than specifying an album, then a new album is automatically created within that folder with a name such as "FolderName: Date". If another photo is uploaded to the folder by that subscriber on the same date, then it will be added to their existing album (note that each subscriber to a folder will get their own separate album). Optionally, a user can specify a "timeout period" for a folder—in this case, a new album will be created any time that a user uploads to a folder, and a user-specified amount of time has transpired since they last uploaded to that folder. Another option is to allow the user to specify an "Active Album" for a folder. Every photo that the user uploads that folder will be added to the Active Album, until the user specifies otherwise. These "auto-album" settings can drastically simplify the UI (User Interface) around uploading the only thing that the user has to do is specify which photos are to be uploaded. Everything else can be handled automatically. In certain cases as when a phonecam, PDA or wireless digital camera is used, auto-upload may be enabled, in which case the only thing that the user has to do is hit the shutter button, and all of the uploading and organization is done automatically ("You take the picture, we do the rest."). While auto-albuming has been described in conjunction with folders, it is not limited to this case. One could just as easily have account-wide auto-albuming.

As described, the folder architecture preserves the idea that only one person can add photos to a particular album. However, there are cases where it would be interesting and useful to have a "collapsed" view across the entire folder, not limited to one author at a time. There are several ways that this can be accomplished:

Organized by time. In this case, there would be a feature that would allow a user to look at all the photos in the folder organized by time. The user could specify a date, or date-range, and see a "virtual album" that contained all of the photos taken on that date, irrespective of who took that photo. Another variation of this is "Show me the N most recently added photos in this folder". A timeline view (where photo density is color coded) is another obvious and compelling UI.

Organized by rating. In order to implement this, there would have to be some mechanism by which ratings could be associated with individual photos. This could be done explicitly by asking viewers to give ratings to photos, or implicitly (collaborative filtering). Whichever mechanism is chosen, there would be a mechanism by which a user could choose to view the N most popular photos in a folder (or the N least popular).

Organized by keyword. The idea here is that a user should be able to enter a search phrase, and find all of the photos in the folder that are associated with that search phrase.

Organized by author. Since one author can have multiple albums in a folder, this would simply collapse all of those author's albums into one derived collection.

Organized by location. With access to location data (GPS, etc.), it becomes possible to organize the photos in a folder based on location. This could be done by having the user supply a location and a maximum distance ("Show me all photos taken within 100 yards of my home address"). Alternatively, we could show the user a map where photo densities are color-coded, and let them zoom in on the area of interest.

Metadata that we have around photos could be used for organizational purposes. One could imagine derived albums that are organized by f-stop settings, color palette (show me all the pictures that are blue), camera manufacturer, most recent comments, etc. If we have the data attached to photos, we can use it for organization.

Note that derived collections (organized searches of a folder) may be saved for future access. Some of these derived collections lend themselves to output products, which are built around groups of photos. For example, one might want to purchase a photo mosaic (Collagio) of a derived album. Other possibilities include calendars, screensavers, etc.

The owner of a folder can specify the default "look and feel" parameters for a folder. First, the owner can choose a default organization. For most cases, this will be the standard album-based view. However, the owner can also choose any of the organizational methods described in the derived albums section. For example, if the owner is creating a photo blog (or other sort of journal), one might choose a time-based view. In this case, the default view of a folder will be open to the derived album for the most recent time interval. Viewers will have the ability to navigate to derived albums for other time intervals. Others might want to create folders that are organized by location or rating. In addition to specifying a default organizational structure, the creator of a view can specify a skin (background appearance) for the folder. This allows the user to personalize each folder with an appearance that is appropriate to the content within the folder.

One special case of a view could be a version of a folder that is marked up in RSS (Rich Site Summary), which is a standardized XML-based scheme for marking up articles on content sites. Search engines (such as Google) know how to parse RSS, and are able to use it for updating search content in real time. For public albums, a special version of each album which is marked up in RSS could be created, and published to the search engine robots.

There are several example use cases, which apply the folder and sharing architecture and capabilities described. In one example, Chris organizes a company party. Before sending out the invitation (or perhaps afterwards), he creates a new folder called 'Company Party'. Through the image provider service, he adds the e-mail addresses of all the company's employees as subscribers to the folder. He gives all of them read/write access, and includes a brief message explaining the purpose of the folder. All of the employees automatically receive an e-mail from the service, which tells them about the folder, and includes Chris' message. It also gives them instructions for opting out of the folder (or just opting out of receiving automatic notifications from the folder). At the party, several employees take pictures and upload them into albums in the personal accounts. Each of these employees then puts their album into the 'Company Party' folder (alternatively, each employee could have uploaded their photos directly to the folder in the first place). At this point, notifications are automatically sent to all of the folder's subscribers, informing them of the new album, and providing a direct link to it. In addition, when any of the subscribers go to their "My Albums" page, they will have the option of browsing 'By Folder': if they select the 'Company Party' folder, they will go to a page that will contain all of the albums in the folder in a single location.

In another example, Peter takes a lot of pictures. He has used the same image services provider for several years, and now has well over 100 albums, which are organized by date. This makes it difficult for him to find old photos quickly. He realizes that most of his albums fall into well-defined categories: baby, architecture, gatherings, and work. So, he decides to create 4 folders and place each of his albums into one of these folders. He has a few albums that fit into more than one folder (like when he brought his baby to work), and image services provider allows him to place a single album into multiple folders. He realizes that he creates a lot of albums of his baby girl, and that he always shares these albums with the same group of people. So, he adds all of these people as read-only subscribers to the folder. In the future, all of these people will automatically receive notifications from image services provider whenever Peter adds a new albums to this folder (they can opt out). All 4 of these folders are available for Peter whenever he goes to his "My Albums" page, making it much easier for him to stay organized. Also, the folder is available to any of the subscribers when they go to "My Friends' Albums".

In another example, Julia and Jill are high school students and best friends. They both have camera phones, and like to share pictures with each other. Julia decides to create a new folder on the image services provider site for sharing their pictures, and both subscribe to the folder. During English class, Julia snaps a picture of the cute boy sitting next to her, and uploads it to the folder, using the "Organize by Date" feature. Since this is the first photo that she has uploaded today, a new album is automatically created for her. Jill automatically receives a notification through e-mail or MMS, and checks out the new picture. Later on, Julia takes another picture of another boy and uploads it. It is automatically added to the same album, and again Julia receives a notification that there is a new picture available. Jill also uses the albums for uploading pictures. Later on, Julia decides that she is no longer friends with Jill, and so she removes Jill as a subscriber from her folder. All of Jill's albums are automatically removed from the folder, and Jill no longer has access to it from her "My Friends' Albums" page, or through any other means. Julia decides that she now likes Buffy and Brenda, so she adds them as subscribers to the folder. Essentially, Julia is able to manage her cliques in part through the image provider's service.

In another example, Stephanie is a realtor. Whenever she has a home for sale, she takes a lot of pictures of the home, and uploads them to an image services provider album. She decides to create a new folder called "Stephanie's Homes for Sale", and puts each of these albums into the folder. She sets the default view to Map-based. She decides to make the album public, and creates a shortcut for it called "StephaniesHomes". From her own website, she now creates a link to http://www.ofoto.com/folders/StephaniesHomes/. Now, anyone on Stephanie's website can click through on that link. They will need to create an account (if they don't already have one), at which point they will see a map-based view of all the albums in her folder. In addition, they will automatically receive notifications whenever Stephanie adds pictures of a new home. Stephanie can remove albums from the folder as they are sold.

In another example, Margery is a big baseball fan, and particularly loves the Baltimore Orioles. Every time she goes to an Orioles game, she tries to get there for batting practice, so she can get up close and take lots of pictures of her favorite players. She places the pictures from each game into its own album, and she creates a folder called "Orioles Pictures". She decides to make the album globally accessible, and she associates it with the keywords "baseball, Baltimore, orioles". Nancy decides to visit the image provider website, and she is also an Orioles fan. She goes to the search feature, and types in "orioles". She sees a list of folders (sorted by frequency of access), and Margery's folder is at the top. Nancy can now subscribe to this folder, and see all of the pictures of her favorite players. In addition, she is able to add her own pictures after she attends games (Margery has chosen the read/write/review model, just to make sure that no one adds pictures of some other team).

In another example, Lisa goes to a peace rally. She has her Nokia 3650 with her and decides to take some pictures. It occurs to her that there are a lot of people there with cameras and camera-phones, so she decides to check and see if there is an image service provider public album for the rally. She goes to the public album search tool on the image service provider WAP site, and types in "Peace Rally San Francisco" and discovers that there already is one set up. So, she uploads all of her pictures to this folder, using the auto-album feature. After the rally, she decides to go back and look at the other pictures in the folder. She chooses to "View by Rating" and looks at the 50 most popular pictures from the rally. They are so compelling that she decides to order an auto-generated photo collage of these photos. Even though the individual photos are mostly 640×480, the composite collage looks wonderful at 20"×30, so she decides to order several extra copies for her friends.

In another example, Adam decides he wants to create a blog. Since he already has an image service provider account, he simply creates a new folder called "Adam's Toy Blog" and makes it publicly accessible. He searches through the 100s of available skins, and finds one that matches his purpose—fun, but not too silly. He sets the default view of the folder to "journal mode", so that anyone who comes to see it will start with his most recent pictures/thoughts. He now sets his Nokia 3650 to automatically upload to this folder, and to use the auto-albuming feature. As he goes throughout his day, he snaps pictures here and there, and periodically adds snippets of text from the 3650. Periodically, he finds himself in front of a computer, and is able to add more text from there. He creates links to other blogs, and quickly finds that many others are linking back to him.

PARTS LIST 10 access device
12 access device
14 access device
16 Communication Network/Internet
18 on-line image service provider
20 server
30 user account
32 designated electronic address
34 first user
36 first user's primary electronic address
40 notification preference
42 designated electronic address
44 first user
46 specified electronic address of first user
48 electronic message
50 primary electronic address of first user

The invention claimed is:

1. A method for organizing and sharing digital images over a communication network to a single user, the single user having more than one electronic address, comprising the steps of:
providing an image server by a service provider for storing the digital images for the user, said user registering on the server two or more electronic addresses owned by the user which may receive e-mail for the user;
said server recording one of said two or more electronic addresses as a primary electronic address for the user in accordance with instructions from said user; and
said server automatically forwarding a plurality of e-mail, at least one of which is addressed to said primary electronic address and at least another of which is addressed to a second one of said registered two or more electronic addresses owned by the user, to said primary electronic address in one combined electronic message that is received over the communication network, said e-mail including a link to shared images and/or image folders.

2. The method according to claim 1 wherein said two or more electronic addresses each comprise an SMS address.

3. The method to claim 1 wherein said primary electronic address comprises an MMS address.

4. The method according to claim 1 wherein one of said electronic addresses comprises a phone number.

5. A system for organizing and managing digital images over a communication network for a single user, the single user having more than one electronic address, comprising:
a server for storing the digital images for the user, for registering two or more electronic addresses owned by the user which are capable of receiving e-mail for the user over the communication network, for designating one of said two or more electronic addresses as a primary electronic address for the user, and for automatically forwarding in a single combined e-mail a plurality of electronic messages that include at least one electronic message addressed to said primary electronic address and at least another addressed to a second one of said two or more electronic addresses for use by said user, the e-mail including a link to the digital images and/or image folders stored on said server.

6. A system according to claim 5 wherein said communication network comprises the Internet.

7. A system according to claim 5 wherein said two or more electronic addresses each comprise an MMS address.

8. A system according to claim 5 wherein said primary electronic address comprises an SMS address.

9. A system according to claim 5 wherein said one of said two or more electronic addresses comprises an electronic address of a phone.

* * * * *